(12) United States Patent
LaBarge et al.

(10) Patent No.: US 7,647,696 B2
(45) Date of Patent: Jan. 19, 2010

(54) CATALYST SUBSTRATE HAVING IMPROVED THERMAL DURABILITY

(75) Inventors: William J. LaBarge, Bay City, MI (US); Russell Paul Richmond, Clifford, MI (US); Gerald Leroy Vaneman, Grand Blanc, MI (US)

(73) Assignee: Umicore AG & Co. KG, Hanau (DE)

( * ) Notice: Subject to any disclaimer, the term of this patent is extended or adjusted under 35 U.S.C. 154(b) by 302 days.

(21) Appl. No.: 11/709,591

(22) Filed: Feb. 22, 2007

(65) Prior Publication Data
US 2008/0028608 A1 Feb. 7, 2008

Related U.S. Application Data

(62) Division of application No. 09/747,370, filed on Dec. 21, 2000, now abandoned.

(51) Int. Cl.
*B01D 50/00* (2006.01)
*B01J 8/02* (2006.01)
*B01J 27/00* (2006.01)

(52) U.S. Cl. .................. 29/890; 422/177; 422/179; 422/180; 422/211; 502/208

(58) Field of Classification Search .............. 29/890, 29/890.043, 890.08; 422/171, 177, 179, 422/180, 211; 502/208
See application file for complete search history.

(56) References Cited

U.S. PATENT DOCUMENTS

| 4,381,289 A | * | 4/1983 | Nowell et al. ............... 423/311 |
| 4,985,212 A | * | 1/1991 | Kawakami et al. .......... 422/179 |
| 5,116,581 A | | 5/1992 | Cyron et al. |
| 5,268,199 A | | 12/1993 | Brown et al. |
| 5,447,694 A | | 9/1995 | Swaroop et al. |
| 5,488,018 A | | 1/1996 | Limaye |
| 5,948,683 A | * | 9/1999 | Koermer et al. ............... 436/37 |
| 5,950,423 A | | 9/1999 | Hampton |
| 6,375,910 B1 | * | 4/2002 | Deeba et al. .............. 423/239.1 |

FOREIGN PATENT DOCUMENTS

| DE | 0494388 | * | 7/1992 |
| JP | 54072788 A2 | | 6/1979 |
| JP | 59170173 A2 | | 9/1984 |

(Continued)

OTHER PUBLICATIONS http://www.matweb.com/SpecificMaterial.asp?bassnum=CM0017&group=General: MatWeb Materials Property Database: Cordierite (Morgan Matroc): Dec. 12, 2000; 2 pages.

(Continued)

*Primary Examiner*—David P Bryant
*Assistant Examiner*—Alexander P Taousakis
(74) *Attorney, Agent, or Firm*—Smith Gambrell & Russell LLP

(57) ABSTRACT

A catalyst substrate comprises a substrate material having an inlet, an outlet, an opening therebetween to allow for the passage of exhaust gas therethrough, and further comprises a catalyst and a layer of zirconium phosphate. Catalyst substrates coated with zirconium phosphate exhibit improved thermal durability, improved thermal shock resistance, and improved alkali and acidic corrosion resistance.

4 Claims, 1 Drawing Sheet

FOREIGN PATENT DOCUMENTS

| | | | |
|---|---|---|---|
| JP | 3075262 | A2 | 3/1991 |
| JP | 4238862 | A2 | 8/1992 |
| JP | 7101772 | A2 | 4/1995 |
| JP | 10270063 | A2 | 10/1998 |
| JP | 11-090226 | | 6/1999 |

OTHER PUBLICATIONS http://www.matweb.com/SpecificMaterial.asp?bassnum=CAR008&group=General: MatWeb Materials Property Database: AREMCO Aremcolox TM 502-1550. Med. Density: Dec. 12, 2000; 2 pages.

* cited by examiner

CATALYST SUBSTRATE HAVING IMPROVED THERMAL DURABILITY

This application is a division of U.S. patent application Ser. No. 09/747,370, filed Dec. 21, 2000; now abandoned.

TECHNICAL FIELD

This disclosure relates to exhaust systems and, more particularly, to catalyst substrates for use with catalytic converters in exhaust systems.

BACKGROUND

Due to stringent exhaust emissions regulations catalyst substrates are being designed and manufactured with thinner walls. To increase the durability and structural integrity of thin walled catalyst substrates zirconia is commonly added to cordierite formulations. The addition of zirconia decreases the porosity of the catalyst substrate, making it prone to experiencing and forming microcracks in its structure. This, in turn, increases the likelihood that the structural integrity of the catalyst substrate may be compromised at high operating temperatures in an exhaust system.

To prevent microcrack formation conventional catalyst substrates having a cordierite formulation are typically coated with alumina and low amounts of platinum, palladium, and/or rhodium. Conventional catalyst substrates also employ high percentages of rare earth metals such as cerium and lanthium, alkaline earth metals such as barium, and transition metals and their oxides such as nickel oxides. Although alumina, when combined with cordierite, does not lower the softening point of cordierite, precious metals, such as the rare earth, alkaline earth and transition metals, when combined with cordierite, all lower the softening and melting point of cordierite.

One drawback associated with existing catalyst substrates is the increased thermal expansion and conductivity of the catalyst substrate as a result of excessive precious metal-cordierite material blends. Another recognized drawback is that alumina fills the microcracks in the cordierite when applied to the catalyst substrate. As the catalyst substrate's temperature increases, alumina will expand within the microcracks and further compromise the structural integrity of the catalyst substrate. Yet another recognized drawback is that precious metal coatings are commonly applied with an acidic solution, which etches the cordierite surface, and can compromise the structural integrity of the catalyst substrate even further.

Consequently, there is a need for a catalyst substrate having improved thermal durability without the above-mentioned drawbacks.

SUMMARY

The drawbacks and disadvantages of the prior art are overcome by the exemplary embodiment of the catalyst substrate, its method of manufacture, and the catalytic converter, and its method of manufacture, described herein. The catalyst substrate for use with a catalytic converter comprises a substrate material comprising an inlet, an outlet, an opening for the passage of exhaust gas therethrough, and comprising a catalyst and zirconium phosphate. A method for manufacturing a catalyst substrate having improved thermal durability for use with a catalytic converter comprises forming a catalyst substrate comprising a catalyst; and applying zirconium phosphate to the catalyst substrate.

The catalytic converter comprises a catalyst substrate comprising a catalyst and zirconium phosphate. A shell having at least one end, and an opening between the ends for the passage of exhaust gas therethrough, is concentrically disposed around the catalyst substrate. A mat support material is disposed between the catalyst substrate and shell, and concentrically around the catalyst substrate. A method for manufacturing a catalytic converter comprises forming a catalyst substrate comprising a catalyst and zirconium phosphate. The catalyst substrate is concentrically disposed in a shell having at least one end, and an opening for the passage of exhaust gas therethrough. A mat support material is concentrically disposed between the catalyst substrate and shell, and around said catalyst substrate. An exhaust system component is secured to at least one end of said shell.

BRIEF DESCRIPTION OF THE DRAWINGS

Referring to drawing, which is meant to be exemplary and non-limiting.

DESCRIPTION OF THE PREFERRED EMBODIMENT

Figure 1:
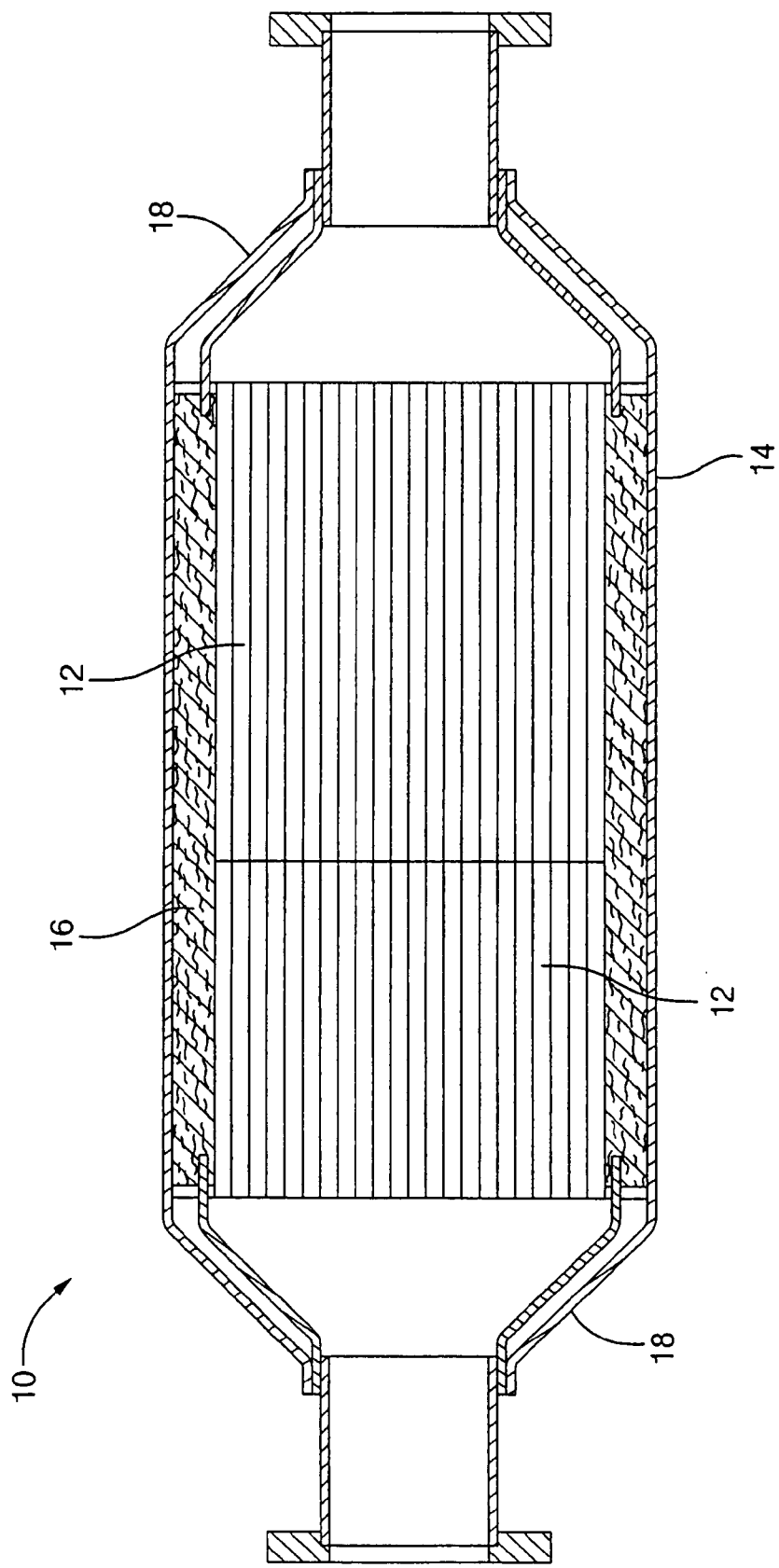
FIG. 1 illustrates a catalytic converter of the present invention containing a catalyst substrate comprising a catalyst and a layer of zirconium phosphate.

The exemplary catalyst substrate having improved thermal durability comprises a substrate material having an inlet, an outlet, an opening therebetween to allow for the passage of exhaust gas therethrough, and further comprises a catalyst and a thermal durability material. The thermal durability material improves the catalyst substrate's thermal durability by filling in microcracks present in the catalyst substrate's exterior surface. Without the thermal durability material the microcracks expand under typical catalytic converter operating conditions, and compromise the catalyst substrate's structural integrity.

A catalytic converter for a mobile vehicle can catalytically treat exhaust gas streams using a catalyst disposed on at least one catalyst substrate. The catalyst substrate can comprise any material designed for use in a spark ignition or diesel engine environment and having the following characteristics: (1) capable of operating at temperatures up to about 1,000° C.; (2) capable of withstanding exposure to hydrocarbons, nitrogen oxides, carbon monoxide, carbon dioxide, and/or sulfur; and (3) having sufficient surface area and structural integrity to support the desired catalyst. Some possible materials include cordierite, silicon carbide, metallic foils, alumina sponges, porous glasses, and the like, and mixtures comprising at least one of the foregoing, with cordierite and mixtures comprising cordierite preferred. Some ceramic materials include "HONEY CERAM", commercially available from NGK-Locke, Inc, Southfield, Mich., and "CELCOR", commercially available from Corning, Inc., Corning, N.Y.

Zirconia can also preferably be added to the catalyst substrate material to increase the structural integrity of the thin walled, high cell density catalyst substrates.

Although the catalyst substrate can have any size or geometry, the size and geometry are preferably chosen to optimize the surface area in the given catalytic converter design parameters. Typically, the catalyst substrate has a honeycomb cell geometry, with the cells being any multi-sided or rounded shape, with substantially square, hexagonal, octagonal or similar geometries preferred due to ease of manufacturing and increased surface area.

The catalyst substrate is formed into a cell structure with a plurality of cells arranged in a honeycomb pattern using an extrusion technique, or the like. The extrusion technique is a mechanical operation that forms the substrate into the desired shape by extruding wet, soft substrate material from a die with patterned openings, with any combination of cell density and cell wall thickness imparted to the resulting cellular structure.

For example, conventional catalyst substrates can comprise about 400 cells per square inch, with cell walls having a thickness of about 8 to 10 mils, wherein one mil is equal to about 0.001 inches or about 0.025 millimeters. The thin walled, high cell density catalyst substrates can preferably comprise up to and exceeding about 1,200 cells per square inch, with cell walls having a thickness of about 2 mils to about 3.5 mils, with about 2.5 mils preferred, and about 2 mils especially preferred.

Disposed on and/or throughout the catalyst substrate can be a catalyst layer for converting exhaust gases to acceptable emissions levels as is known in the art. The catalyst may comprise one or more catalyst materials that are wash coated, imbibed, impregnated, physisorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, nickel, copper, and the like, and oxides, mixtures and alloys comprising at least one of the foregoing, and other conventional catalysts.

In addition to disposing a catalyst on and/or throughout the catalyst substrate, a corrosive resistant, thermal durability material can also be disposed on part or all of the catalyst substrate using any one of, or a combination of the methods described above. The thermal durability material can be an organophosphate compound, wherein the cation is preferably a transition metal, rare earth metal, alkaline metal, and combinations comprising at least one of the foregoing, and the like, such as cerium, lanthium, barium, aluminum, and zirconium, with zirconium phosphate preferred. Zirconium phosphate can bond with the zirconia that is already present in the cordierite mixture of the catalyst substrate material. Zirconium phosphate is preferably applied to cordierite, or a cordierite mixture of catalyst substrate material using a dipping process. The catalyst substrate can be dipped into a solution comprising zirconium metal and phosphoric acid, which reacts to form zirconium phosphate. The resulting layer of zirconium phosphate has a thickness of up to about 10 nanometers, with up to about 8 nanometers preferred, and up to about 4 nanometers especially preferred.

Zirconium phosphate possesses the following advantageous characteristics: (1) density of about 2.83 g/cc; (2) an open porosity percentage range of about 15 to about 20 percent; (3) a thermal conductivity value of about 6.2 BTU-in/hr-ft$^2$-° F.; (4) the ability to withstand a maximum service temperature value of about 2,800° F.; and (5) ultra high thermal shock resistance such that it can be heated or cooled at approximately 2,000° C. per minute without experiencing thermal shock. It is also resistant, under both basic and acidic conditions, to corrosive materials such as rare earth elements, alkaline earth elements, transition metal oxides, and precious metal salts, as well as compositions containing nitrogen oxides and sulfur oxides.

In contrast, cordierite possesses a lower density of about 2.44 g/cc, an open porosity percentage of about zero, and a thermal conductivity value of about 14 BTU-in/hr-ft$^2$-° F. Unlike zirconium phosphate, acidic conditions will etch a cordierite based catalyst substrate's surface, and weaken its structural integrity. In addition, a cordierite based catalyst substrate can only withstand a maximum service temperature of up to about 1,000° C., and possess a low tolerance to thermal shock resistance.

Disposed concentrically around the catalyst substrate, to form a catalyst substrate/mat support material subassembly, is a mat support material that insulates the shell from both the high exhaust gas temperatures and the exothermic catalytic reaction occurring within the catalyst substrate. The mat support material, which enhances the structural integrity of the catalyst substrate by applying compressive radial forces about it, reducing its axial movement, and retaining it in place, is concentrically disposed around the catalyst substrate to form a mat support material/catalyst substrate subassembly. The mat support material can either be an intumescent material, e.g., one which contains ceramic materials, and other conventional materials such as an organic binder and the like, or combinations comprising at least one of the foregoing, and a vermiculite component that expands with heating to maintain firm uniform compression when the shell expands outward from the catalyst substrate, or a non-intumescent material, which does not contain vermiculite, as well as materials which include a combination of both. Typical non-intumescent materials include materials sold under the trademarks "NEXTEL" and "SAFFIL" by the "3M" Company, Minneapolis, Minn., or those sold under the trademark, "FEBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The mat support material/catalyst substrate subassembly can be concentrically disposed within a catalytic converter shell. The choice of material for the shell depends upon the type of exhaust gas, the maximum temperature of the catalyst substrate, the maximum temperature of the exhaust gas stream, and the like. Suitable materials for the shell can comprise any material that is capable of resisting under-car salt, temperature and corrosion. Typically, ferrous material is employed such as ferritic stainless steels. Ferritic stainless steels can include stainless steels such as the 400-Series such as SS-409, SS-439, and SS-441, with grade SS-409 generally preferred. An endcone, an endplate or an exhaust manifold assembly can be secured to the shell containing the mat support material/catalyst substrate subassembly to complete assembly of the catalytic converter.

Referring now to FIG. 1, a catalytic converter 10 comprising at least one catalyst substrate 12 comprising a catalyst and a corrosive resistant, thermal durability material disposed upon a substantial portion, or the entirety of its surface, is concentrically disposed within a shell 14. A mat support material 16 is concentrically disposed between the shell 14 and catalyst substrate 12, and around the catalyst substrate 12. The shell 14 includes at least one end, and an opening for the passage of exhaust gas therethrough. The ends are secured to at least one endcone 18, endplate (not shown), or an exhaust manifold cover (not shown), and further connected to an exhaust system component (not shown) such as an exhaust manifold assembly, connecting pipe, exhaust pipe, coupling assembly, flexible coupling assembly, mounting flange, or other exhaust system component, and combinations comprising at least one of the foregoing. As exhaust gas enters the exhaust system, the exhaust gas stream passes through the catalytic converter. The catalyst substrate catalytically treats the exhaust gas stream to remove environmentally unfriendly exhaust gas elements.

The exemplary method for fabricating the exemplary catalyst substrate having improved thermal durability is further illustrated by the following non-limiting example.

EXAMPLE

A soft, wet catalyst substrate material comprising a mixture cordierite, up to about 70% by weight of zirconium, is extruded through a die with patterned openings to form a cell structure arranged in a honeycomb pattern. The catalyst substrate contains up to and exceeding about 1200 cells per square inch, with cell walls having a thickness of about 2 mills. The catalyst substrate is calcined for approximately two hours at approximately 1460° C. Once cooled, the catalyst substrate is then dipped into a solution comprising about 100 grams of zirconium carbonate, and about one liter of phosphoric acid. A layer of zirconium phosphate having a thickness of approximately 4 nanometers forms on the catalyst substrate surface. The catalyst substrate is then calcined for approximately two hours at approximately 500° C. Once the catalyst substrate has cooled, a catalyst washcoat, comprising conventional catalyst materials and soluble binder material, is then wash coated, imbibed, impregnated, physisorbed, chemisorbed, or otherwise applied to the catalyst substrate. The catalyst substrate is then calcined for approximately 2 hours at approximately 500° C. The resulting catalyst substrate comprises a catalyst washcoat layer disposed upon a zirconium phosphate layer that covers the catalyst substrate surface.

The catalyst substrate described herein possesses several advantages over conventional catalyst substrates having enhanced thermal durability characteristics. First, thin walled, high cell density catalyst substrates cannot be manufactured from aluminum phosphate-cordierite mixtures using the industry wide preferred extrusion method. Aluminum phosphate-cordierite compositions are brittle and very frangible when extruded to form a thickness of about 2 mils to about 3.5 mils. The resulting catalyst substrate would break very easily during assembly and operation. In contrast, zirconium phosphate coated zirconium-cordierite based catalyst substrate can be manufactured using industry wide preferred methods. Furthermore, the resulting thin walled, high cell density catalyst substrates possess enhanced thermal durability properties over aluminum phosphate-cordierite based catalyst substrates.

Second, soluble binder materials are compatible with zirconium phosphate and will not compromise the catalyst substrate's structural integrity. Soluble binder materials fill microcracks found in the catalyst substrate's skin. When the catalyst substrate is calcined, the binder material expands and enlarges the microcracks. As a result, the catalyst substrate's structural integrity is further compromised and weakened. In contrast, zirconium phosphate possesses a crystalline structure and coefficient of thermal expansion that when heated allows it to expand within its own crystal lattice network. Zirconium phosphate can fill the microcracks, and expand without enlarging them. Consequently, coating the catalyst substrate with zirconium phosphate enhances both its structural integrity and thermal durability.

Third, zirconium phosphate naturally binds to existing zirconia present in zirconia-cordierite mixtures. In addition, zirconium phosphate can be applied using several conventional techniques that will not compromise or weaken the catalyst substrate's structural integrity. Conventional thermal durability materials such as calcium magnesium zirconium phosphate, sodium zirconium phosphate, and barium zirconium phosphate, are applied using a sol gel process described in U.S. Pat. No. 5,268,199 to Brown, Jr., et al. The sol gel process possesses several drawbacks when compared to the present application. First, the sol gel process must oxidize the ceramic material's surface by oxidizing it using an acid wash procedure. When applying this technique to a thin walled, high cell density catalyst substrate, the acid wash will etch the skin and weaken the catalyst substrate's structure. Second, unlike zirconium phosphate, calcium magnesium zirconium phosphate is incompatible with conventional catalyst materials. As a result, applying the sol gel process to a thin walled, high cell density catalyst substrate will weaken its structure, and, consequently, increase the likelihood that breakage will occur during assembly and/or operation of the catalytic converter.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for manufacturing a catalytic converter, comprising:
    forming a catalyst substrate comprising a catalyst by applying a layer of zirconium phosphate to said catalyst;
    disposing concentrically said catalyst substrate in a shell having an opening;
    disposing concentrically a mat support material between said catalyst substrate and said shell, and around said catalyst substrate; and
    securing an exhaust system component to at least one end of said shell;
    wherein said applying further comprises reacting zirconium metal with phosphoric acid to form a solution, and dipping said catalyst into said solution.

2. The method according to claim 1 further comprising disposing on and/or throughout the catalyst a member selected from the group consisting of platinum, palladium, rhodium, iridium, osmium, ruthenium, oxides, mixtures and alloys thereof.

3. A method for manufacturing a catalyst substrate for use with a catalytic converter, comprising:
    forming a catalyst substrate comprising a catalyst; and
    applying a layer of zirconium phosphate to said catalyst, wherein said applying further comprises reacting zirconium metal with phosphoric acid to form a solution, and dipping said catalyst into said solution.

4. The method according to claim 3 further comprising disposing on and/or throughout the catalyst a member selected from the group consisting of platinum, palladium, rhodium, iridium, osmium, ruthenium, oxides, mixtures and alloys thereof.

* * * * *